(12) United States Patent
Yoon

(10) Patent No.: US 12,372,829 B2
(45) Date of Patent: Jul. 29, 2025

(54) DISPLAY DEVICE

(71) Applicant: LG ELECTRONICS INC., Seoul (KR)

(72) Inventor: Hyunkwan Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/645,710

(22) Filed: Apr. 25, 2024

(65) Prior Publication Data

US 2025/0004327 A1    Jan. 2, 2025

(30) Foreign Application Priority Data

Jun. 27, 2023   (KR) ........................ 10-2023-0082780

(51) Int. Cl.
  *G02F 1/13357*   (2006.01)
  *G02F 1/1333*    (2006.01)

(52) U.S. Cl.
  CPC .. *G02F 1/133608* (2013.01); *G02F 1/133354* (2021.01); *G02F 1/133605* (2013.01); *G02F 1/133606* (2013.01)

(58) Field of Classification Search
  CPC ......... G02F 1/133608; G02F 1/133354; G02F 1/133605; G02F 1/133606
  See application file for complete search history.

(56) References Cited

U.S. PATENT DOCUMENTS

2017/0219881 A1*  8/2017  Shin ................. G02F 1/133608
2020/0379298 A1* 12/2020  Notoshi ........... G02F 1/133603

FOREIGN PATENT DOCUMENTS

| KR | 10-2016-0141983 | 12/2016 |
| KR | 10-2017-0091544 | 8/2017  |
| KR | 10-2018-0004464 | 1/2018  |

OTHER PUBLICATIONS

Korean Intellectual Property Office Application No. 10-2023-0082780, Notice of Allowance dated Oct. 30, 2024, 2 pages.

\* cited by examiner

*Primary Examiner* — Donald L Raleigh
(74) *Attorney, Agent, or Firm* — LEE, HONG, DEGERMAN, KANG & WAIMEY

(57) ABSTRACT

A display device is disclosed. The display device includes: a display panel; a frame positioned at a rear of the display panel and to which the display panel is coupled; a substrate positioned on the frame between the display panel and the frame; a light assembly mounted on the substrate and providing light to the display panel; and a reflective sheet positioned on the frame and the substrate, having a hole through which the light assembly passes, and reflecting the light provided by the light assembly to the display panel, wherein: the frame includes a sheet support portion to support the reflective sheet, a substrate support portion forming a step descending from the sheet support portion and defining a gap with the reflective sheet, and a cut-out portion configured as an opening formed through the frame at one side of the substrate support portion; and the substrate is positioned on the substrate support portion of the frame and is inserted into the cut-out portion.

12 Claims, 16 Drawing Sheets

DISPLAY DEVICE

CROSS-REFERENCE TO RELATED APPLICATION(S)

Pursuant to 35 U.S.C. § 119 (a), this application claims the benefit of earlier filing date and right of priority to Korean Patent Application No. 10-2023-0082780, filed on Jun. 27, 2023, the contents of which are all hereby incorporated by reference herein in their entireties.

BACKGROUND

1. Technical Field

The present disclosure relates to a display device.

2. Description of the Related Art

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used.

Among them, an LCD panel includes a thin film transistor (TFT) substrate and a color substrate that are disposed opposite each other with a liquid crystal layer interposed therebetween. The LCD panel can display an image using light provided by a backlight unit.

Recently, a lot of research has been conducted on a backlight unit that provides light to a display panel for increasing the space efficiency of a display device.

SUMMARY

It is an objective of the present disclosure to solve the above and other problems.

It is another objective of the present disclosure to provide a display device that can increase the structural stability of a backlight unit.

It is yet another objective of the present disclosure to provide a display device that can increase the structural stability of an LED substrate.

It is yet another objective of the present disclosure to provide a display device that can increase the light uniformity.

It is yet another objective of the present disclosure to provide a display device with a backlight unit capable of increasing the light efficiency.

It is yet another objective of the present disclosure to provide a display device that can increase the heat dissipation efficiency.

According to an aspect of the subject matter described in this application, a display device includes: a display panel; a frame positioned at a rear of the display panel and to which the display panel is coupled; a substrate positioned on the frame between the display panel and the frame; a light assembly mounted on the substrate and configured to provide light to the display panel; and a reflective sheet positioned on the frame and the substrate and having a hole through which the light assembly passes, the reflective sheet reflecting the light provided by the light assembly to the display panel. The frame may include: a sheet support portion to support the reflective sheet; a substrate support portion forming a step descending from the sheet support portion, the substrate support portion defining a gap with the reflective sheet; and a cut-out portion configured as an opening formed through the frame at one side of the substrate support portion. The substrate may be positioned on the substrate support portion of the frame and may be inserted into the cut-out portion.

A display device according to the present disclosure has the following effects.

According to least one of the embodiments of the present disclosure, it is possible to provide a display device that increases structural stability of a backlight unit.

According to least one of the embodiments of the present disclosure, it is possible to provide a display device that increases structural stability of an LED substrate.

According to least one of the embodiments of the present disclosure, it is possible to provide a display device that increases the light uniformity.

According to least one of the embodiments of the present disclosure, it is possible to provide a display device with a backlight unit capable of increasing the light efficiency.

According to least one of the embodiments of the present disclosure, it is possible to provide a display device that increases the heat dissipation efficiency.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

DETAILED DESCRIPTION

Figure 1:
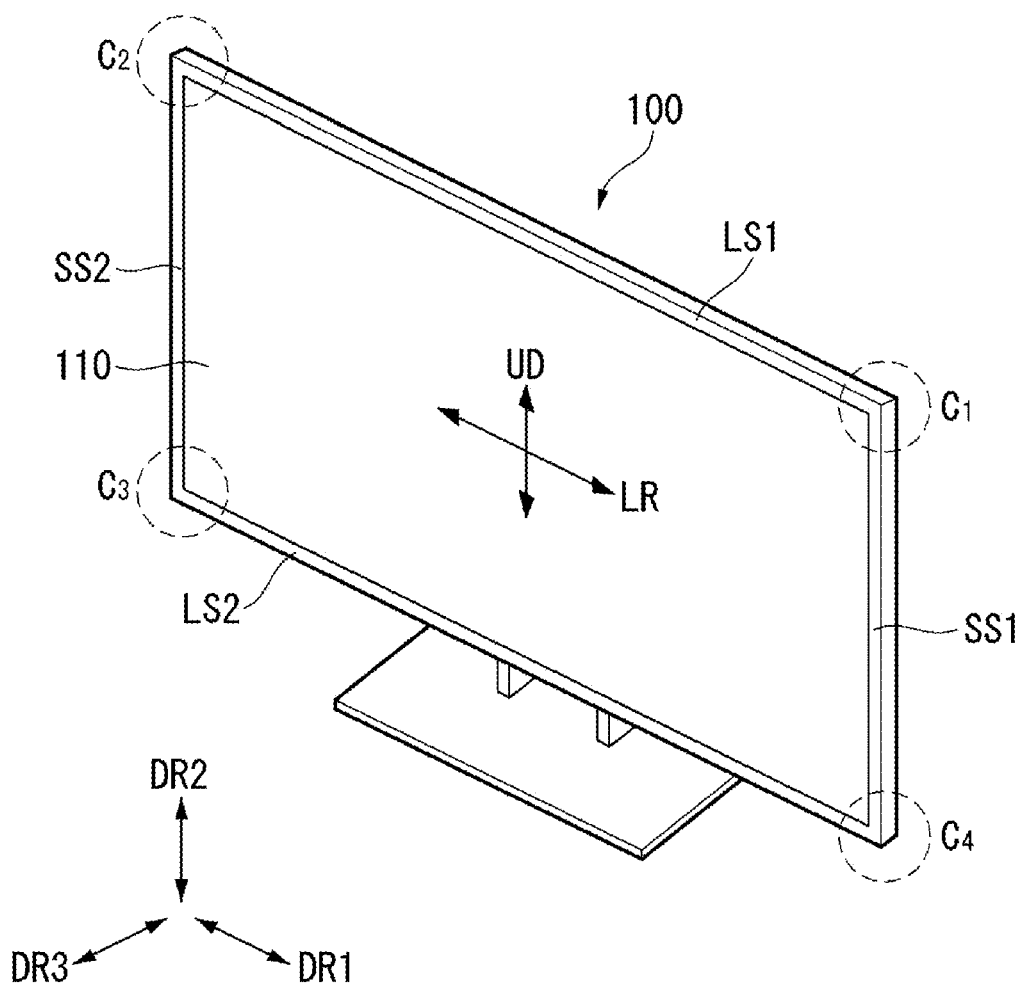
FIGS. 1 to 16 illustrate examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function. In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

It will be understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

Hereinafter, a description will be given using a liquid crystal display (LCD) panel as an example of a display panel, but the display panel applicable to the present disclosure is not limited to the LCD panel.

In the following description, a display device 100 may include a first long side LS1, a second long side LS2 opposite the first long side LS1, a first short side adjacent to the first long side LS1 and the second long side LS2, and a second short side SS2 opposite the first short side SS1.

Here, the first short side SS1 may be referred to as a first side area; the second short side SS2 may be referred to as a second side area opposite the first side area; the first long side LS1 may be referred to as a third side area that is adjacent to the first side area and the second side area and positioned between the first side area and the second side area; and the second long side LS2 may be referred to as a fourth side area that is adjacent to the first side area and the second side area, positioned between the first side area and the second side area, and opposite the third side area.

For the convenience of explanation, it is illustrated and described that lengths of the first and second long sides LS1 and LS2 are greater than lengths of the first and second short sides SS1 and SS2. However, the lengths of the first and second long sides LS1 and LS2 may be substantially equal to the lengths of the first and second short sides SS1 and SS2.

In addition, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the second direction DR2 may be collectively referred to as a horizontal direction. The third direction DR3 may be referred to as a vertical direction.

A side or surface on which the display device 100 displays an image may be referred to as a front, a front surface, or a front side. When the display device 100 displays an image, a side or surface on which the image cannot be viewed may be referred to as a rear, a back, a rear surface, a rear side, a back surface, or a back side. When the display device 100 is viewed from the front or the front surface, the first long side LS1 may be referred to as a top, a top surface, an upper surface, or an upper side. Similarly, the second long side LS2 may be referred to as a bottom, a bottom surface, a lower surface, or a lower side. Similarly, the first short side SS1 may be referred to as a right, a right surface, or a right side, and the second short side SS2 may be referred to as a left, a left surface, or a left side.

The first long side LS1, the second long side LS2, the first short side SS1, and the second short side SS2 may be referred to as edges of the display device 100. In addition, points where the first short side LS1, the second long LS2, the first short side SS1, and the second short side SS2 meet one another may be referred to as corners. For example, a point where the first long side LS1 and the first short side SS1 meet may be referred to as a first corner C1; a point where the first long side LS1 and the second short side SS2 meet may be referred to as a second corner C2; a point where the second short side SS2 and the second long side LS2 meet may be referred to as a third corner C3; and a point where the second long side LS2 and the first short side SS1 meet may be referred to as a fourth corner C4.

Here, a direction from the first short side SS1 to the second short side SS2 or a direction from the second short side SS2 to the first short side SS1 may be referred to as a left-and-right direction LR. A direction from the first long side LS1 to the second long side LS2 or a direction from the second long side LS2 to the first long side LS1 may be referred to as an up-and-down direction UD.

Figure 2:
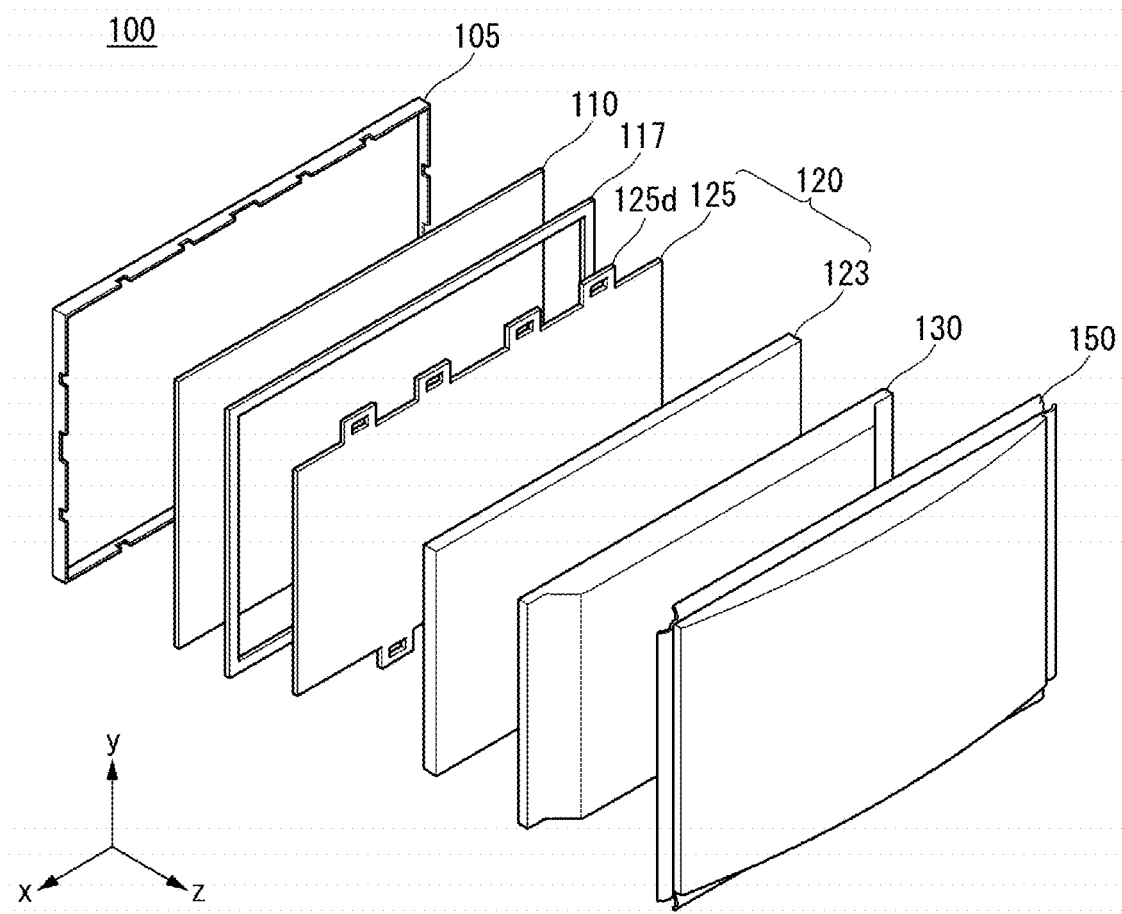

Referring to FIGS. 1 and 2, a display panel 110 may be disposed at the front of the display device 100, and may display an image. The display panel 110 may include a plurality of pixels to output the image while controlling color, brightness, and chroma of each pixel.

The display panel 110 may be divided into an active area in which an image is displayed and an inactive area in which no image is displayed. The display panel 110 may include a front substrate and a rear substrate that are disposed opposite each other with a liquid crystal layer interposed therebetween.

The front substrate may include a plurality of pixels each including red (R), green (G), and blue (B) subpixels. The front substrate may generate light corresponding to a color of red, green, or blue in response to a control signal.

The rear substrate may include switching elements. The rear substrate may switch a pixel electrode. For example, the pixel electrode may change the molecular arrangement of a liquid crystal layer in response to a control signal input from the outside. The liquid crystal layer may include a plurality of liquid crystal molecules. The arrangement of liquid crystal molecules may be changed according to a voltage difference generated between the pixel electrode and a common electrode. The liquid crystal layer may transmit light provided by a backlight unit 120 to the front substrate.

A front cover 105 may cover at least a portion of a front surface or a side surface of the display panel 110. The front cover 105 may have the shape of a rectangular frame with a hollow center.

The front cover 105 may include a front cover and a side cover. Namely, the front cover 105 may be divided into the front cover at the front surface of the display panel 110 and the side cover at the side surface of the display panel 110. The front cover and the side cover may be separately configured. One of the front cover and the side cover may be omitted.

A guide panel 117 may be positioned at the rear of the display panel 110. The guide panel 117 may support a portion of a rear surface of the display panel 110. The guide panel 117 may be in contact with an outer edge of the display panel 110. The guide panel 117 may be coupled to a frame 130.

The backlight unit 120 may be positioned at the rear of the display panel 110. The backlight unit 120 may include a plurality of light sources. The backlight unit 120 may be of a direct type or an edge type.

The blacklight unit 120 may be positioned at the front of the frame 130. For example, the plurality of light sources may be disposed on a front surface of the frame 130, which may be collectively referred to as a direct-type backlight unit.

The backlight unit 120 may be driven by a full driving scheme or a partial driving scheme such as local dimming, impulsive, etc. The backlight unit 120 may include an optical sheet 125 and an optical layer 123.

The optical sheet 125 may disperse light of the light sources. The optical sheet 125 may consist of a plurality of layers. For example, the optical sheet 125 may include at least one prism sheet and/or at least one diffusion sheet.

The optical sheet 125 may include at least one coupling portion 125d. The coupling portion 125d may be coupled to the front cover 105, the frame 130, and/or a back cover 150. That is, the coupling portion 125d may be directly coupled to the front cover 105, the frame 130, and/or the back cover 150. Alternatively, the coupling portion 125d may be coupled to a structure coupled on the front cover 105, the frame 130, and/or the back cover 150. That is, the coupling portion 125d may be indirectly coupled to the front cover 105, the frame 130, and/or the back cover 150.

The optical layer 123 may include a light source, a light guide plate, a diffusion sheet, and/or a reflective sheet.

The frame 130 may support components of the display device 100. For example, the backlight unit 120 and the like may be coupled to the frame 130. The frame 130 may be made of a metal material such as an aluminum alloy.

The back cover 150 may be disposed at the rear of the display device 100. The back cover 150 may protect internal components from outside environments. At least a portion of the back cover 150 may be coupled to the frame 130 and/or the front cover 105. The back cover 150 may be an injection-molded product of a resin material.

Figure 3:
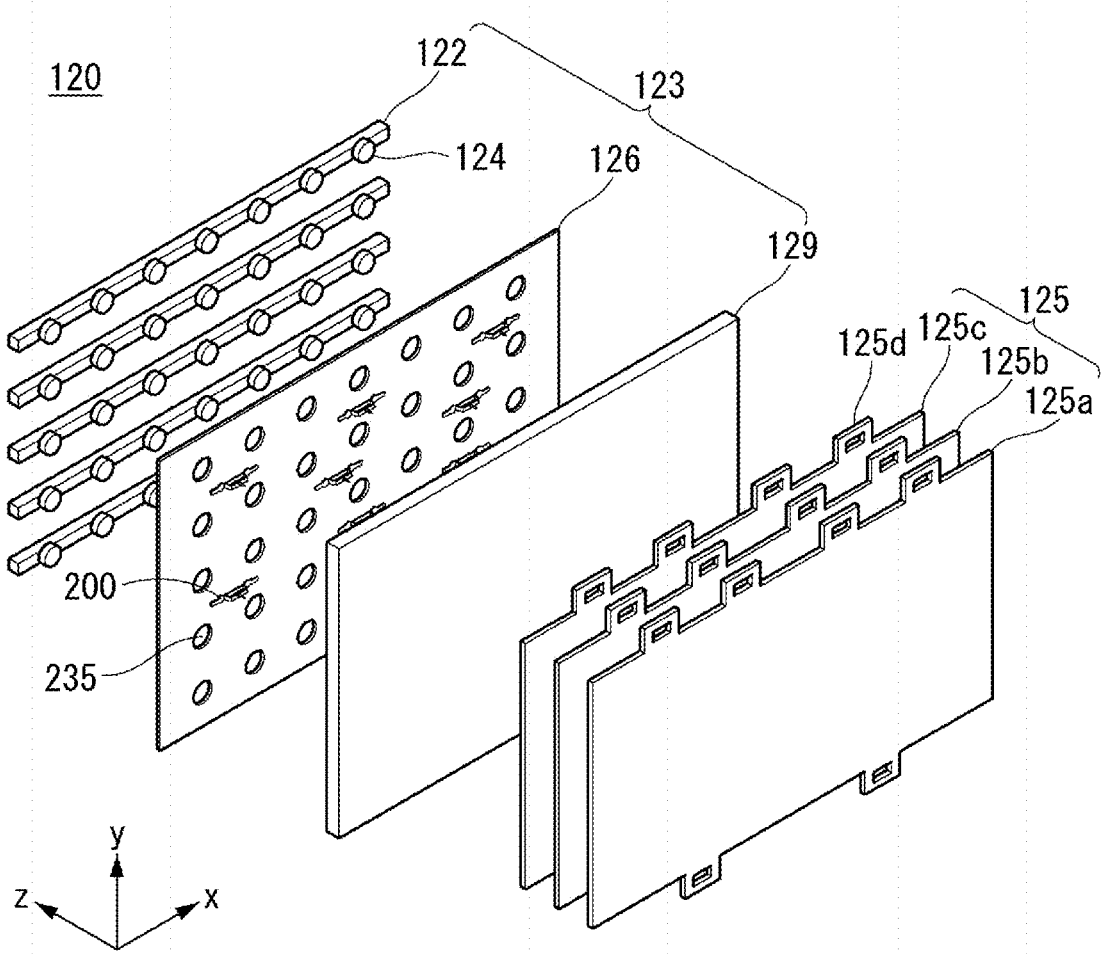

Referring to FIG. 3, the backlight unit 120 may include: the optical layer 123 that includes a substrate 122, at least one light assembly 124, a reflective sheet 126, and a diffusion plate 129; and the optical sheet 125 that is positioned at the front of the optical layer 123. The components of the backlight unit 120 are not limited thereto, and one or more of the components may be omitted.

The substrate 122 may be configured in the form of a plurality of straps extending in a first direction and spaced apart from each other at predetermined intervals in a second direction perpendicular to the first direction.

At least one light assembly 124 may be mounted on the substrate 122. An electrode pattern for connecting an adaptor to the light assembly 124 may be formed on the substrate 122. For example, a carbon nanotube (CNT) electrode pattern may be formed on the substrate 122.

The substrate 122 may be made of at least one of polyethylene terephthalate (PET), glass, polycarbonate (PC), and silicon. The substrate 122 may be a printed circuit board (PCB).

The light assemblies 124 may be disposed on the substrate 122 at predetermined intervals in the first direction. A diameter of the light assembly 124 may be greater than a width of the substrate 122. In other words, the diameter of the light assembly 124 may be greater than a length of the substrate 122 in the second direction.

The light assembly 124 may be a light emitting diode (LED) chip or an LED package including at least one LED chip.

The light assembly 124 may be configured as a colored LED emitting light of at least one of red, blue, and green, or a white LED. The colored LED may include at least one of a red LED, a blue LED, and a green LED.

A light source included in the light assembly 124 may be of a chip-on-board (COB) type. The COB type light source may be configured such that an LED chip, which is a light source, is directly coupled to the substrate 122. Thus, a manufacturing process may be simplified. In addition, resistance may be reduced to thereby reduce energy lost as heat. That is, power efficiency of the light assembly 124 may be increased. The COB type light source may provide brighter lighting. The COB type light source may be made thinner and lighter than the related art.

The reflective sheet 126 may be disposed on a front surface of the substrate 122. The reflective sheet 126 may have a through-hole 235, and the light assembly 124 may be inserted into the through-hole 235.

The reflective sheet 126 may reflect light provided from the light assembly 124 to the front. Further, the reflective sheet 126 may reflect light, reflected from the diffusion plate 129, back toward the diffusion plate 129.

The reflective sheet 126 may include at least one of a metal and a metal oxide, each of which is a reflective material. For example, the reflective sheet 126 may include a metal and/or a metal oxide having high reflectivity, such as at least one of aluminum (Al), silver (Ag), gold (Au), and titanium dioxide ($TiO_2$).

The reflective sheet 126 may be formed by depositing and/or coating a metal or a metal oxide on the substrate 122. Ink containing a metal material may be printed on the reflective sheet 126. The reflective sheet 126 may include a deposition layer formed using a vacuum deposition method such as thermal deposition, evaporation, or sputtering. The reflective sheet 126 may have a coated layer and/or a printed layer formed by printing, gravure coating, or silk-screening.

An air gap may be positioned between the reflective sheet 126 and the diffusion plate 129. The air gap may allow light emitted from the light assembly 124 to spread widely. In order to maintain the air gap, a supporter 200 may be disposed between the reflective sheet 126 and the diffusion plate 129. The air gap may be referred to as an optical gap or an optical depth.

A resin may be deposited on the light assembly 124 and/or the reflective sheet 126. The resin may serve to diffuse light emitted from the light assembly 124. The diffusion plate 129 may diffuse light, emitted from the optical assembly 124, upward.

The optical sheet 125 may be positioned at the front of the diffusion plate 129. A rear surface of the optical sheet 125 may face the diffusion plate 129, and a front surface of the optical sheet 125 may face the rear surface of the display panel 110.

The optical sheet 125 may include at least one or more sheets. In detail, the optical sheet 125 may include one or more prism sheets and/or one or more diffusion sheets. The plurality of sheets included in the optical sheet 125 may be bonded to each other and/or in close contact with each other.

The optical sheet 125 may consist of a plurality of sheets having different functions. For example, the optical sheet 125 may include first to third optical sheets 125a to 125c. The first optical sheet 125a may serve as a diffusion sheet, and the second and third optical sheets 125b and 125c may serve as a prism sheet. The number and/or position of the diffusion sheet and the prism sheet may vary.

The diffusion sheet may prevent light, emitted from the diffusion plate, from being partially concentrated, thereby allowing the light to be more uniformly distributed. The prism sheet may collect light emitted from the diffusion sheet to cause the light to be incident perpendicular to the display panel 110.

The coupling portion 125d may be formed on at least one of sides or edges of the optical sheet 125. The coupling portion 125d may be formed on at least one of the first to third optical sheets 125a to 125c.

The coupling portion 125d may be formed on a long side or an edge of the optical sheet 125. The coupling portion 125d on the first long side and the coupling portion 125d on the second long side may be asymmetric to each other. For example, the coupling portion 125d on the first long side and the coupling portion 125d on the second long side may be different in position and/or number from each other.

Figure 4:
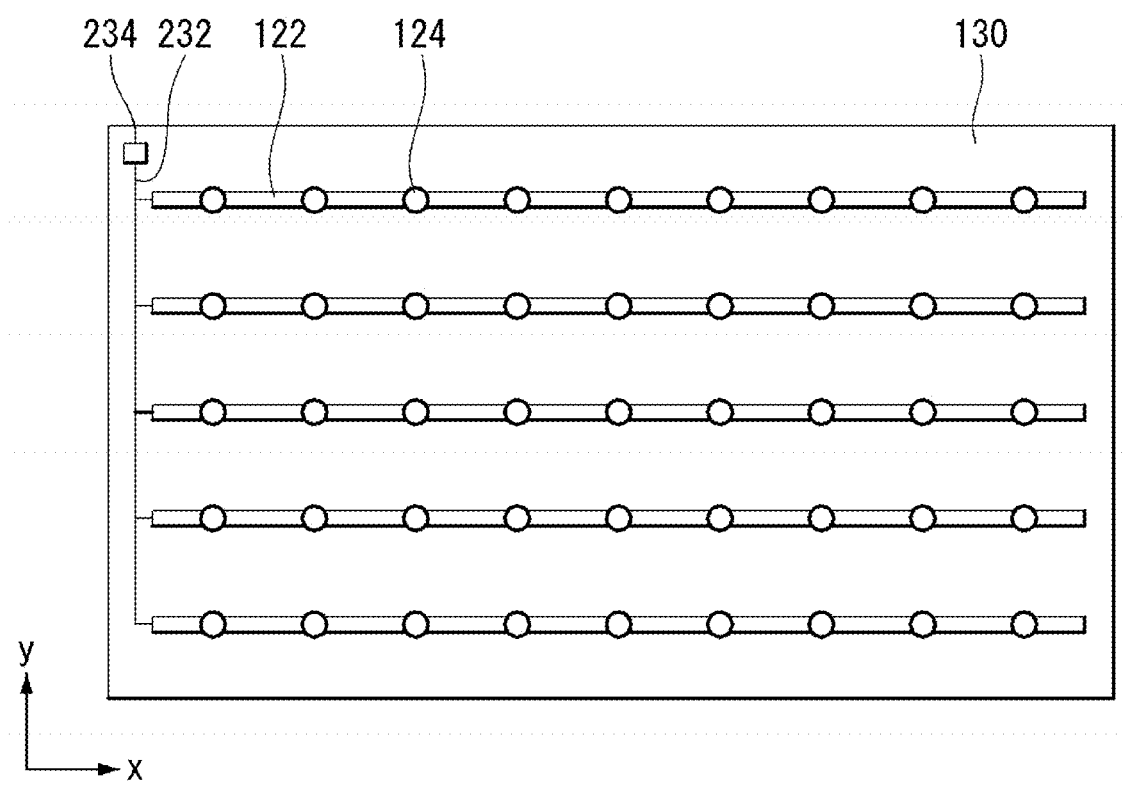

Referring to FIG. 4, the substrate 122 configured as a plurality of straps, which extend in a first direction and are spaced apart from each other at predetermined intervals in a second direction perpendicular to the first direction, may be provided on the frame 130. A plurality of substrates 122 may be connected at one side to a wiring electrode 232.

The wiring electrode 232 may extend in the second direction. The wiring electrode 232 may be connected to one side of the substrate 122 at predetermined intervals in the second direction.

A wiring hole 234 may be formed at one end of the wiring electrode 232. The wiring hole 234 may be a fine hole formed through the frame 130. The wiring electrode 232 may extend to a rear surface of the frame 130 through the wiring hole 234. The wiring electrode 232 may be electrically connected to an adaptor (not shown), which is disposed at the rear surface of the frame 130, through the wiring hole 234.

The light assemblies 124 may be mounted on the substrate 122 at predetermined intervals in the first direction. A diameter of the light assembly 124 may be greater than a width of the substrate 122 in the second direction.

Figure 5:
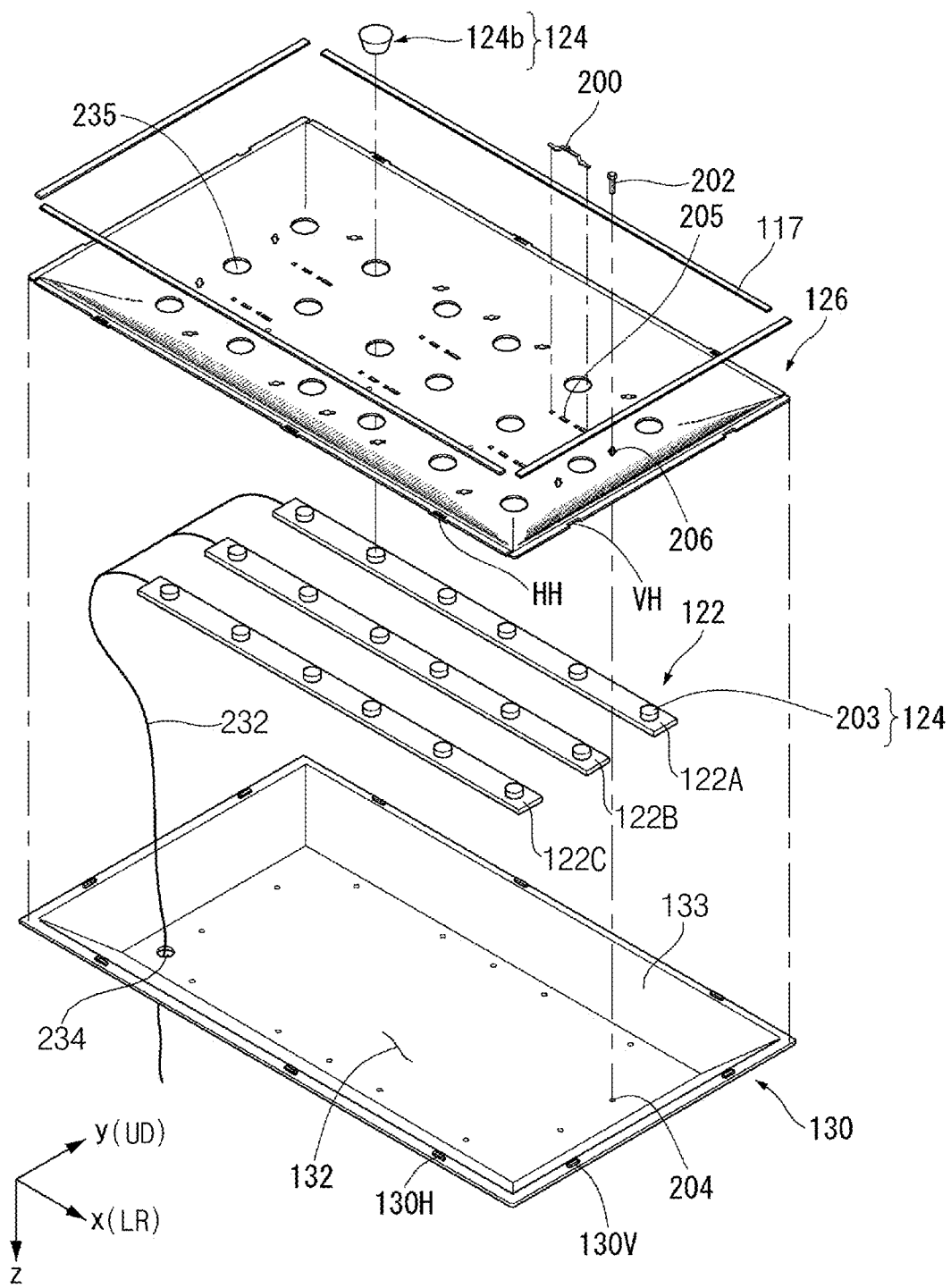

Referring to FIG. 5, the frame 130 may include a flat portion 132 and an inclined portion 133. The flat portion 132 may have the shape of a plate. The inclined portion 133 may be inclined at a predetermined slope from the flat portion 132 and may extend forward from the flat portion 132. The frame 130 may have an overall tubular shape. The reflective sheet 126 may have an overall tubular shape corresponding to the shape of the frame 130. A space may be formed between the inclined portion 133 and the reflective sheet 126.

The substrate 122 may be mounted or disposed on the flat portion 132. A plurality of substrates 122 may be disposed in sequence. The plurality of substrates 122 may be spaced apart from each other. For example, a first substrate 122A may be elongated in a left-and-right direction (LR) of the frame 130, and may be disposed in a longitudinal direction, which is the left-and-right direction (LR) of the frame 130. A second substrate 122B may be elongated in the left-and-right direction (LR) of the frame 130 while being mounted on the frame 130 at a position spaced apart from the first substrate 122A. A third substrate 122C may be elongated in the left-and-right direction (LR) of the frame 130 while being mounted on the frame 130 at a position spaced apart from the second substrate 122B.

Intervals between the substrates 122 may vary depending on the number of pixels of the display panel 110 (see FIG. 2). For example, intervals between the substrates 122 for providing light to the display panel 110 that provides 8K image quality may be less than intervals between the substrates 122 for providing light to the display panel 110 that provides 4K image quality. When the number of pixels of the display panel 110 or the image quality provided by the display panel 110 increases, light transmittance of the display panel 110 may decrease. Thus, in order to increase the brightness of light provided by the backlight unit 120 (see FIG. 3), a large number of substrates 122 may be disposed.

The reflective sheet 126 may include through-holes 235. The plurality of through-holes 235 may correspond to the number of the plurality of light assemblies 124. The reflective sheet 126 may be placed on the frame 130 and/or the substrate 122. In this case, lenses 124b of the plurality of light assemblies 124 may be inserted into the plurality of through-holes 235 to protrude on the reflective sheet 126. The reflective sheet 126 may be coupled or fixed on the frame 130 by a fixing member 202. The supporter 200 may be mounted on the reflective sheet 126.

Coupling ribs 130H and 130V may be formed on an upper end of the inclined portion 133 of the frame 130, and the reflective sheet 126 may have coupling holes VH and HH into which the coupling ribs 130H and 130V are inserted. Accordingly, the reflective sheet 126 may be fixed on the frame 130.

The guide panel 117 may be disposed on an outer side of the reflective sheet 126, and may be coupled to the frame 130. The guide panel 117 may support the display panel 110 (see FIG. 2). The guide panel 117 may be disposed on four sides of the reflective sheet 126.

Figure 6:
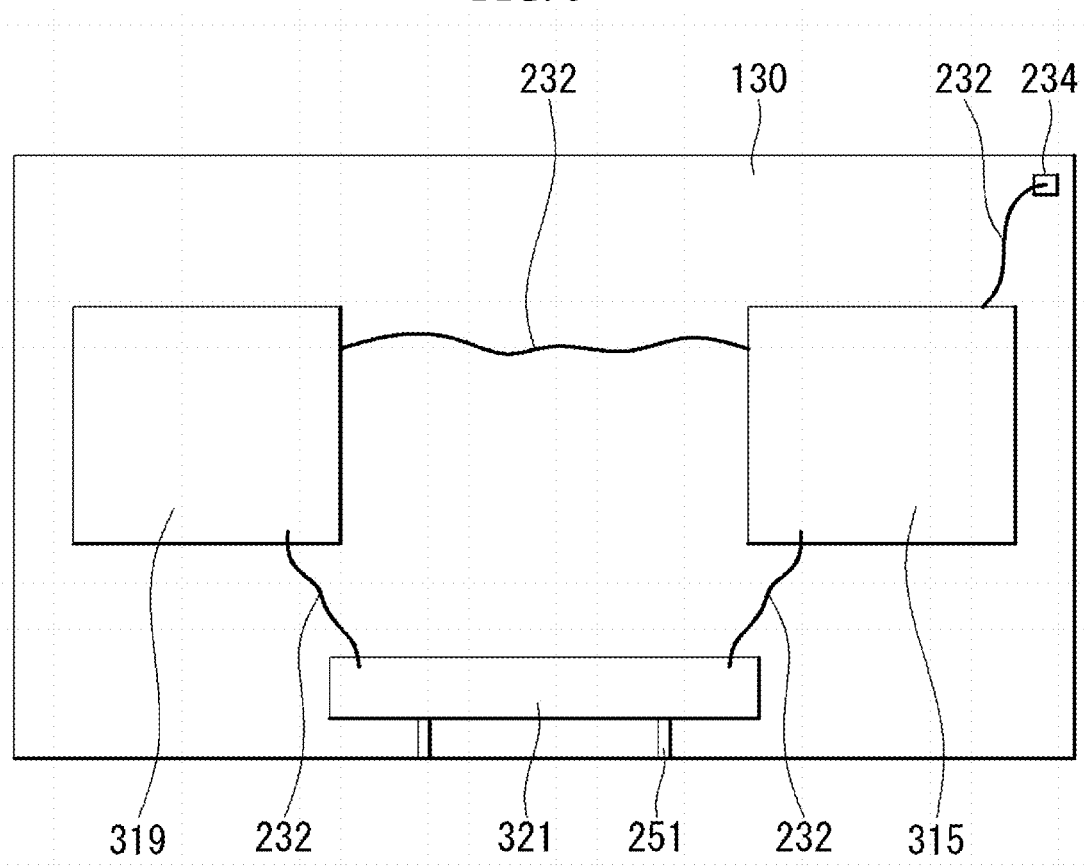

Referring to FIG. 6, the wiring electrode 232, which extends from a front surface of the frame 130 through the wiring hole 234, may be electrically connected to a power supply 313. The wiring electrode 232 may be referred to as a cable 232. The power supply 315 may be a PCB configured to supply power to the display device 100. The power supply 315 may covert AC power into DC power.

The power supply 315 may supply current to the light assembly 124 through the wiring electrode 232. The power supply 315 may be electrically connected to a main board 321 through the wiring electrode 232. The main board 321 may be spaced apart from the power supply 315 by a predetermined distance.

The main board 321 may be a PCB configured to provide an interface for operating the display device 100. The main board 321 may be further configured to check and mange an operating state of each of the components of the display device 100.

The main board 321 and the power supply 315 may be electrically connected to a T-CON board 319 through the wiring electrode 232. The T-CON board 319 may be a PCB configured to transmit power or signals, input from the main board 321 or the power supply 315, to the display panel 110. The T-CON board 319 may be electrically connected to the display panel 110 at the front surface of the frame 130 through a flat flex cable (FFC) 251.

Although FIG. 6 illustrates an example in which the respective PCBs are connected to each other, the present disclosure is not limited thereto, and only at least some of the PCBs may be connected to each other.

Figure 7:
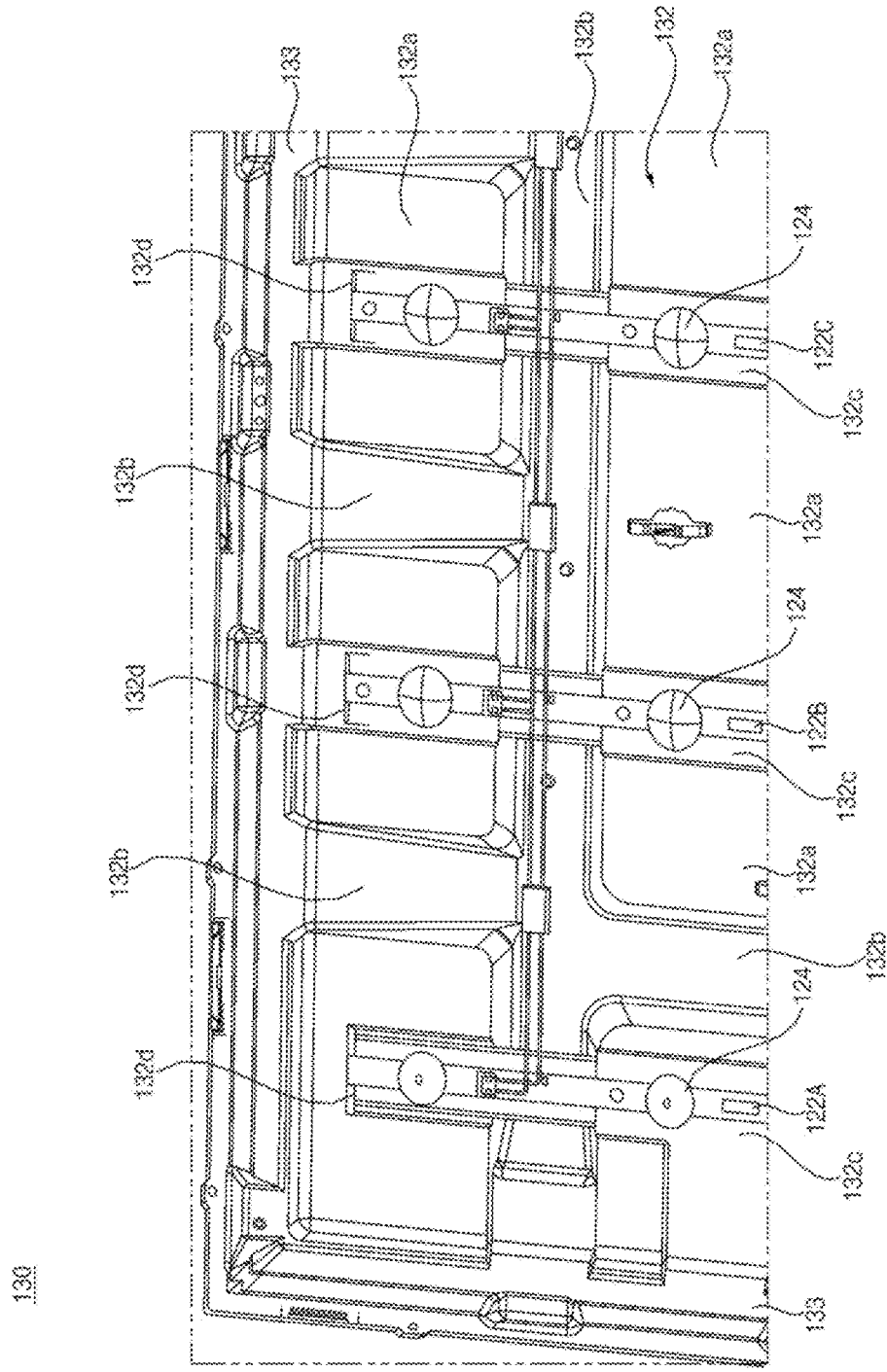
Figure 8:
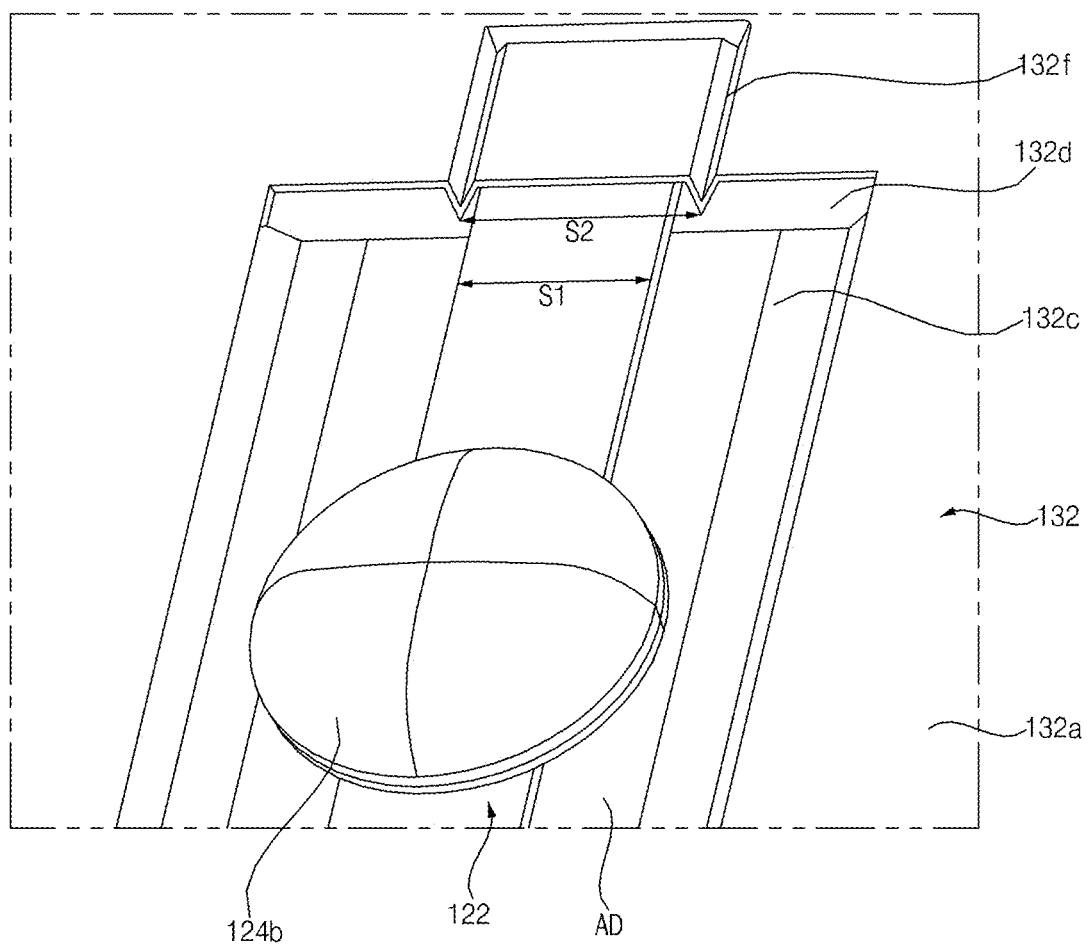
Figure 9:
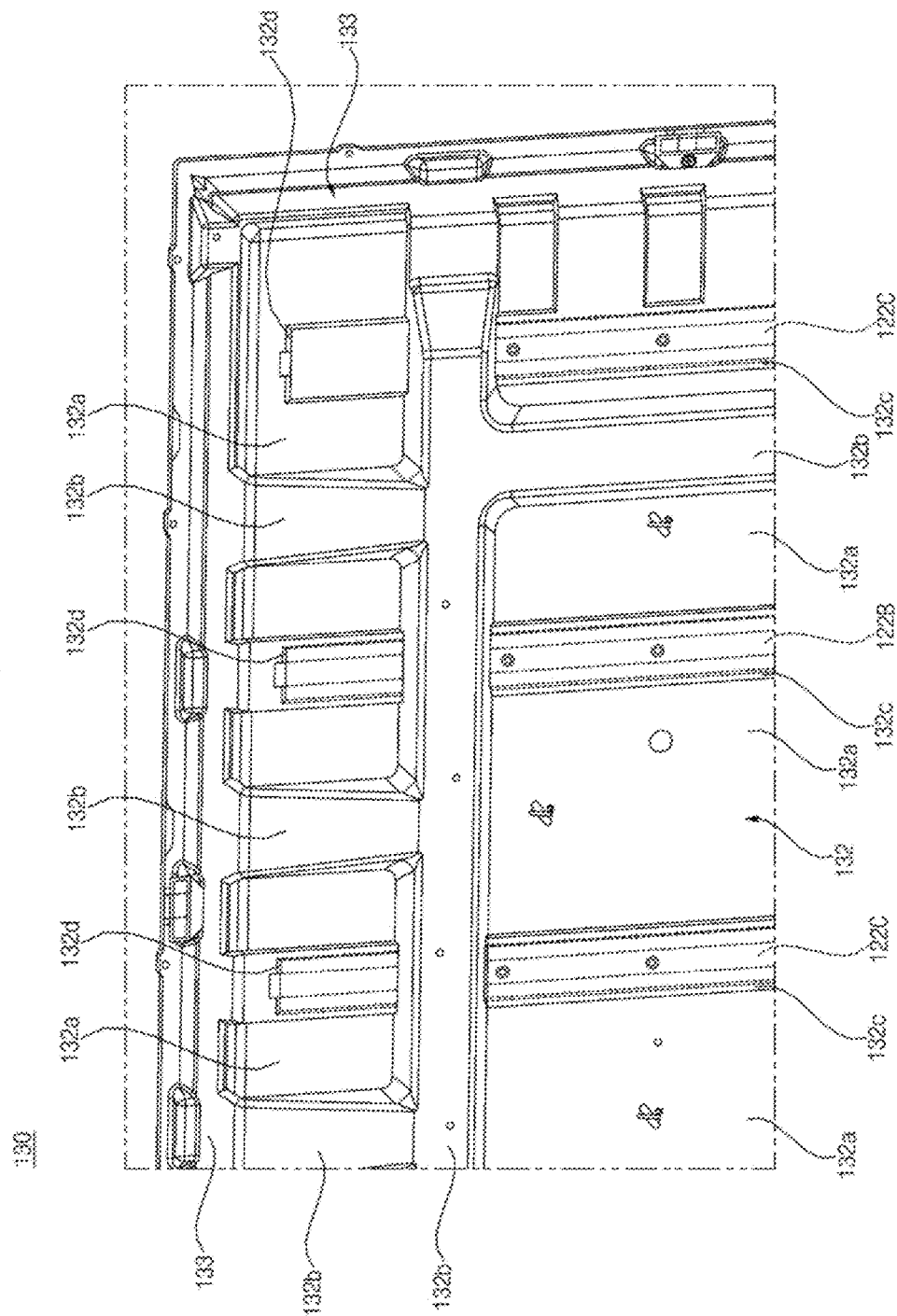
Figure 10:
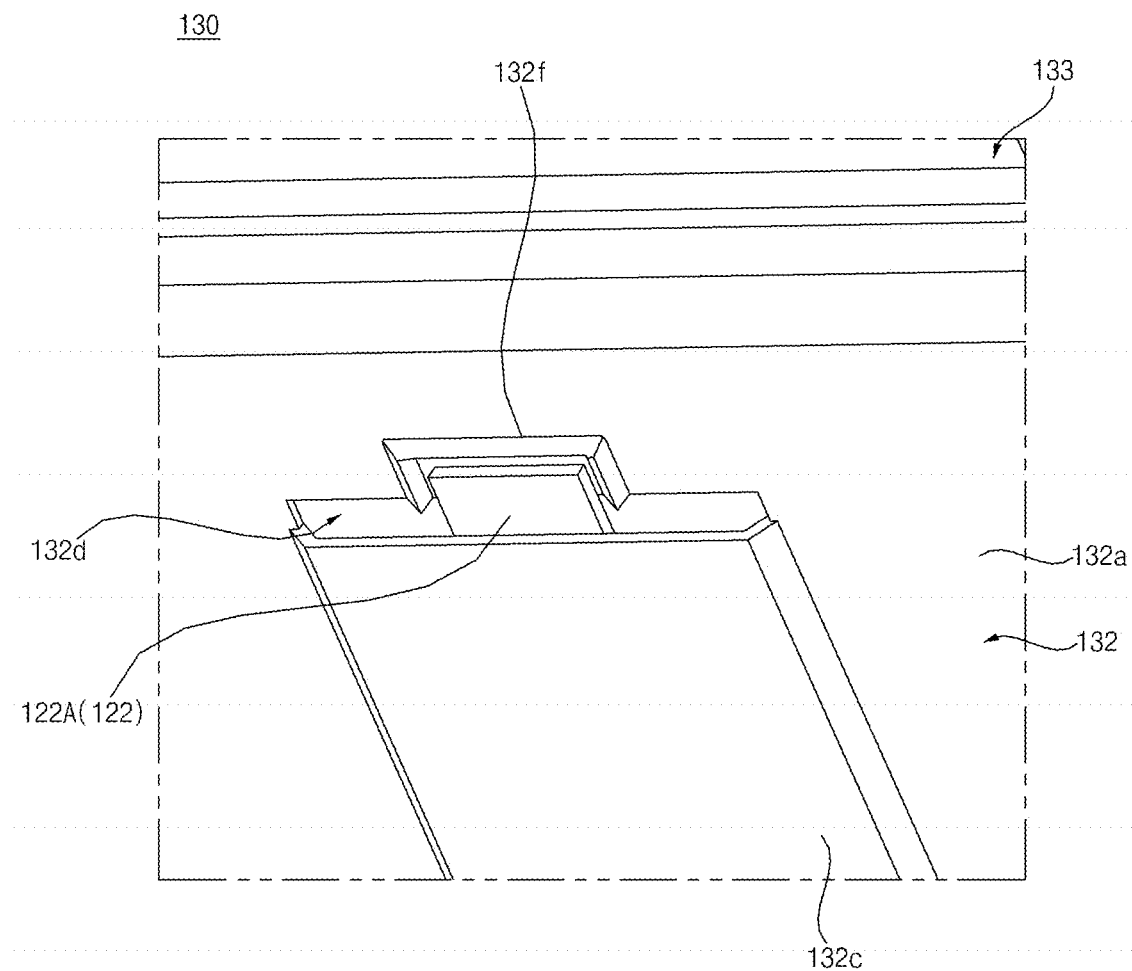
Figure 11:
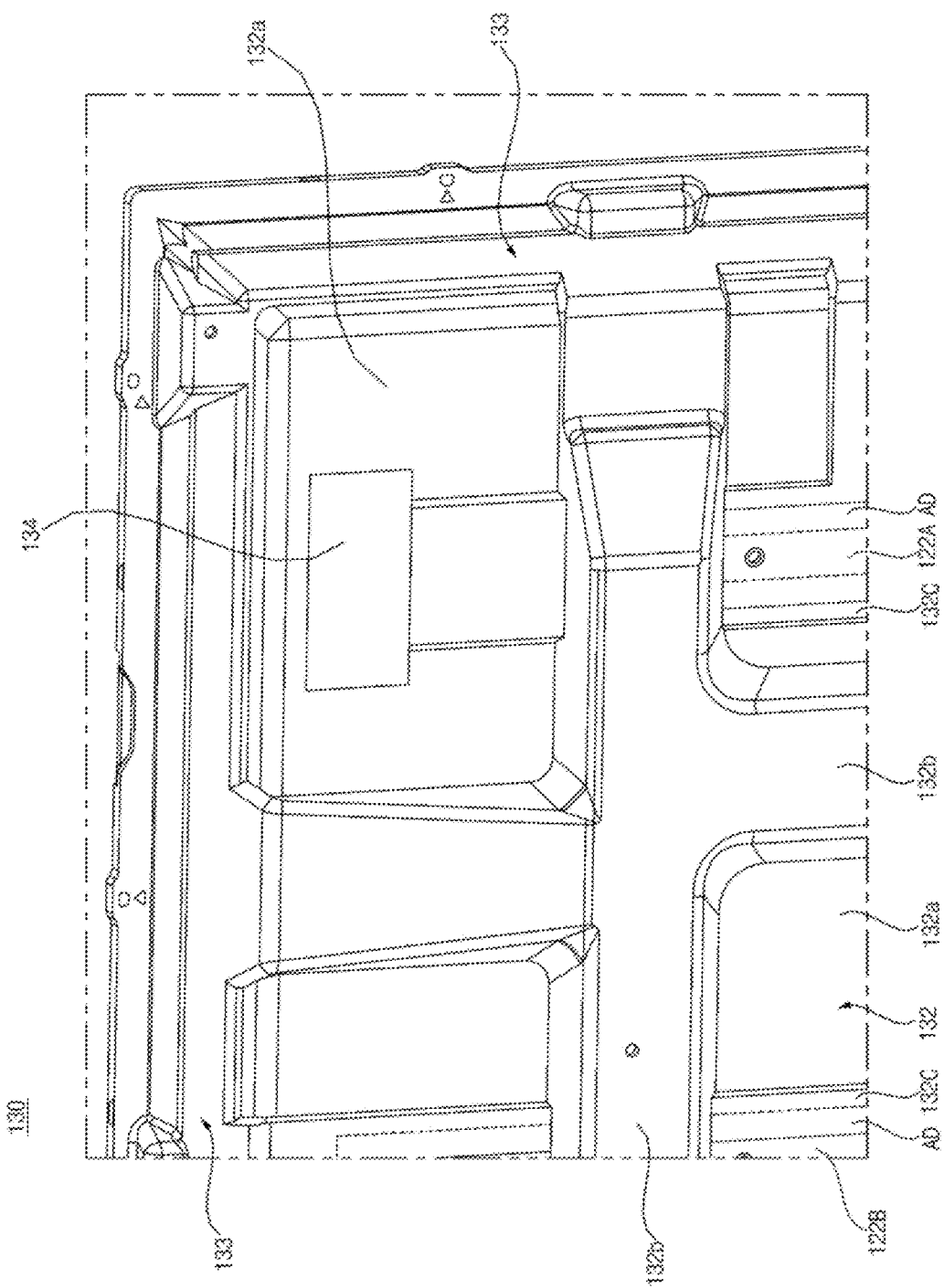
Figure 12:
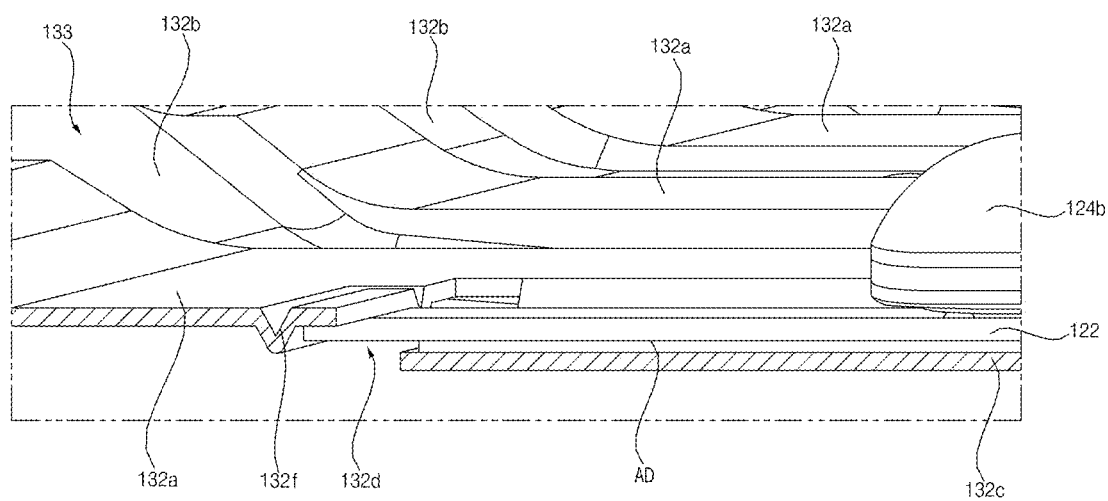

Referring to FIGS. 7 and 8, the frame 130 may include the flat portion 132 and the inclined portion 133. The flat portion 132 and the inclined portion 133 may be formed as the frame 130 is pressed. The flat portion 132 and/or the inclined portion 133 may be pressed while forming a curve. Accordingly, the rigidity of the frame 130 may be increased.

The flat portion 132 may include a reinforcing portion 132b and a support portion 132a. The support portion 132a may define a top surface of the flat portion 132. The reinforcing portion 132b may define a bottom surface of the flat portion 132. The reinforcing portion 132b may form a step descending from the support portion 132a. The support portion 132a may form a step ascending from the reinforcing portion 132b. The support portion 132a may form a block, and the reinforcing portion 132b may form a path penetrating between the blocks defined by the support portion 132a.

The support portion 132a may be referred to as a sheet support portion 132a, and the support portion 132a may further include a substrate support portion 132c. The substrate support portion 132c may have a stepped portion lowered from the sheet support portion 132a. The sheet support portion 132a defining a plurality of blocks may be connected by the substrate support portion 132c. For example, the substrate support portion 132c may form a step descending from the sheet support portion 132a and may form a step ascending from the reinforcing portion 132b. The substrate support portion 132c may intersect the path. The substrate support portion 132c may form a step ascending from the path. The substrate support portion 132c may be elongated in the left-and-right direction or up-and-down direction of the frame 130.

A cut-out portion 132d may be formed at one end of the substrate support portion 132c. The cut-out portion 132d may be formed at one end or both ends of the substrate support portion 132c. The cut-out portion 132d may be formed by cutting out or punching a portion of the substrate support portion 132c and/or the sheet support portion 132a.

An adhesive member AD may be fixed on or attached to the substrate support portion 132c. The substrate 122 may be fixed on the adhesive member AD. A length of the adhesive member AD may correspond to a length of the substrate support portion 132c, and a width of the adhesive member AD may be greater than a width of the substrate 122 and less than a width of the substrate support portion 132c.

Referring to FIGS. 9 to 12, one end of the substrate 122 may be inserted into the cut-out portion 132d. The substrate 122 may penetrate from a front surface of the substrate support portion 132c to a rear surface of the support portion or the sheet support portion 132a through the cut-out portion 132d. A rear surface of the substrate 122 may be in contact with the front surface of the substrate support portion 132c, and a front surface of the substrate 122 may be in contact with the rear surface of the support portion 132a or the sheet support portion 132a.

A sealing sheet 134 may be fixed or attached to the rear surface of the support portion (132a, 132c). The sealing sheet 134 may cover the cut-out portion 132d. The sealing sheet 134 may be attached to the rear surface of the sheet support portion 132a, the rear surface of the substrate support portion 132c, and/or the cut-out portion 132d. The sealing sheet 134 may be a blackout sheet, and may include a black material. For example, the sealing sheet 134 may be a blackout tape. Accordingly, light leakage may be prevented.

Figure 13:
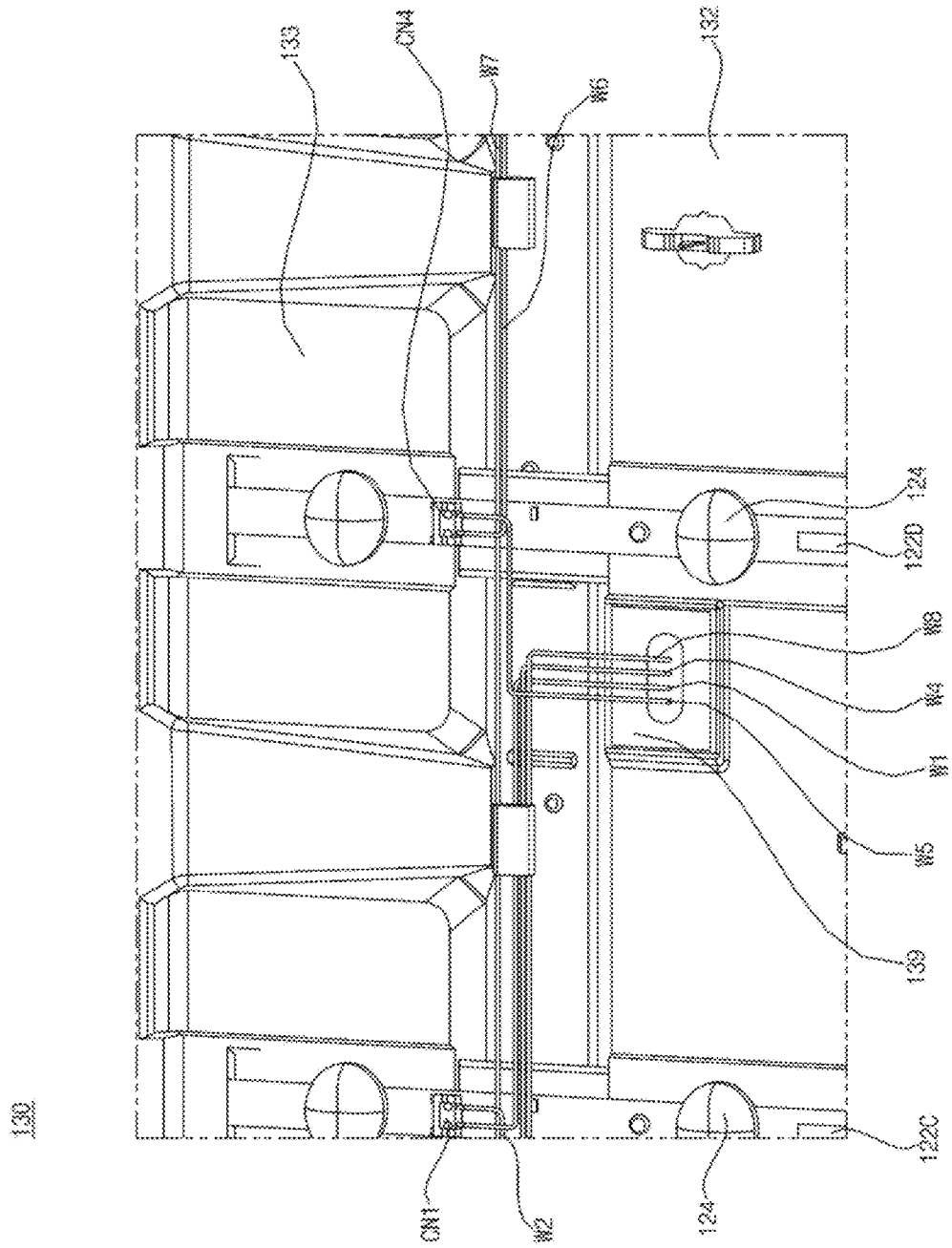
Figure 14:
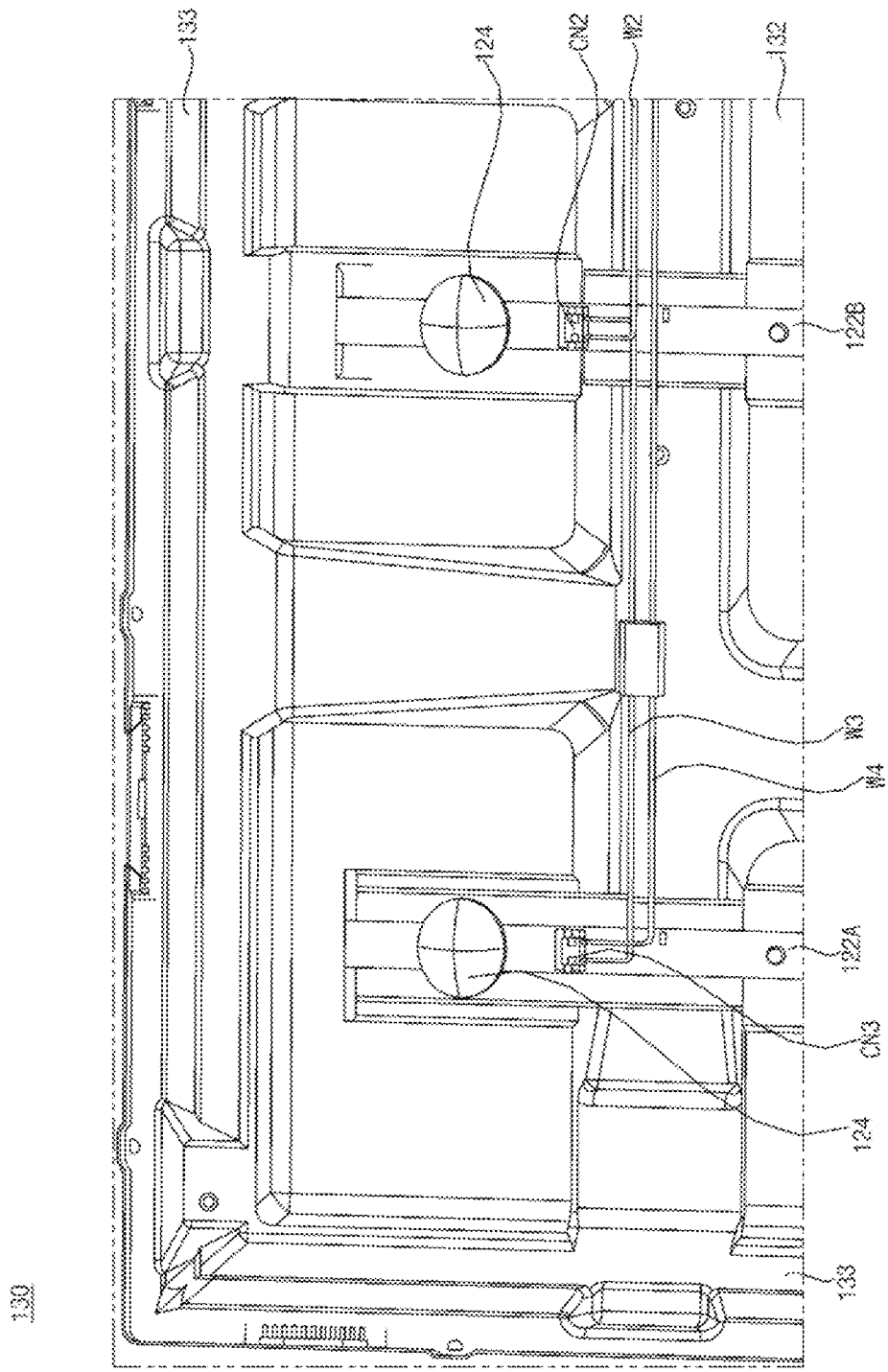

Referring to FIGS. 13 and 14, a connector CN may be mounted on the substrate 122. The connector CN may be electrically connected to the light assembly 124 on the substrate 122. When power is supplied to the connector CN, the light assembly 124 may generate light. A wire W may be connected to the connector CN. A plurality of wires W may be provided.

A first wire W1 may connect the power supply 315 (see FIG. 6) and a first connector CN1. The first wire W1 may supply power provided by the power supply 315 (see FIG. 6) to the light assembly 124 through the first connector CN1. The first connector CN1 may be mounted on a first substrate 122C, so that power may be supplied to the light assemblies 124 on the first substrate 122C through the first wire W1 and the first connector CN1.

A second wire W2 may connect the first connector CN1 and a second connector CN2. The second connector CN2 may be mounted on a second substrate 122B. The second wire W2 may supply power from the first substrate 122C to the second substrate 122B. The power supplied through the second wire W2 may be provided to the light assembly 124 mounted on the second substrate 122B, allowing the light assembly 124 to generate light.

A third wire W3 may connect the second connector CN2 and a third connector CN3. The third connector CN3 may be mounted on a third substrate 122A. The third wire W3 may supply power from the second substrate 122B to the third substrate 122A. The power supplied through the third wire W3 may be provided to the light assembly 124 mounted on the third substrate 122A, allowing the light assembly 124 to generate light.

A fourth wire W4 may connect the third connector CN3 and the power supply 315 (see FIG. 6). For example, the fourth wire W4 may be a ground wire.

A fifth wire W5 may connect the power supply 315 (see FIG. 6) and a fourth connector CN4. The fifth wire W5 may supply power provided by the power supply 315 (see FIG. 6) to the light assembly 124 through the fourth connector CN4. The fourth connector CN4 may be mounted on a fourth substrate 122D, so that power may be supplied to the light assemblies 124 on the fourth substrate 122D through the fifth wire W5 and the fourth connector CN4.

A sixth wire W6 may connect the fourth connector CN4 and another connector CN or an adjacent connector CN. The sixth wire W6 may supply power from the fourth substrate 122D to another substrate 122 or an adjacent substrate 122. The power supplied through the sixth wire W6 may be provided to the light assembly 124 mounted on another substrate 122 or an adjacent substrate 122, allowing the light assembly 124 to generate light.

A seventh wire W7 may be connected to a connector CN of another substrate 122 or an adjacent substrate 122. For example, the seventh wire W7 may be a ground wire. The seventh wire W7 may be electrically connected to an eighth wire W8. The eight wire W8 may be connected to the power supply 315 (see FIG. 6). For example, the eighth wire W8 may be a ground wire.

Figure 15:
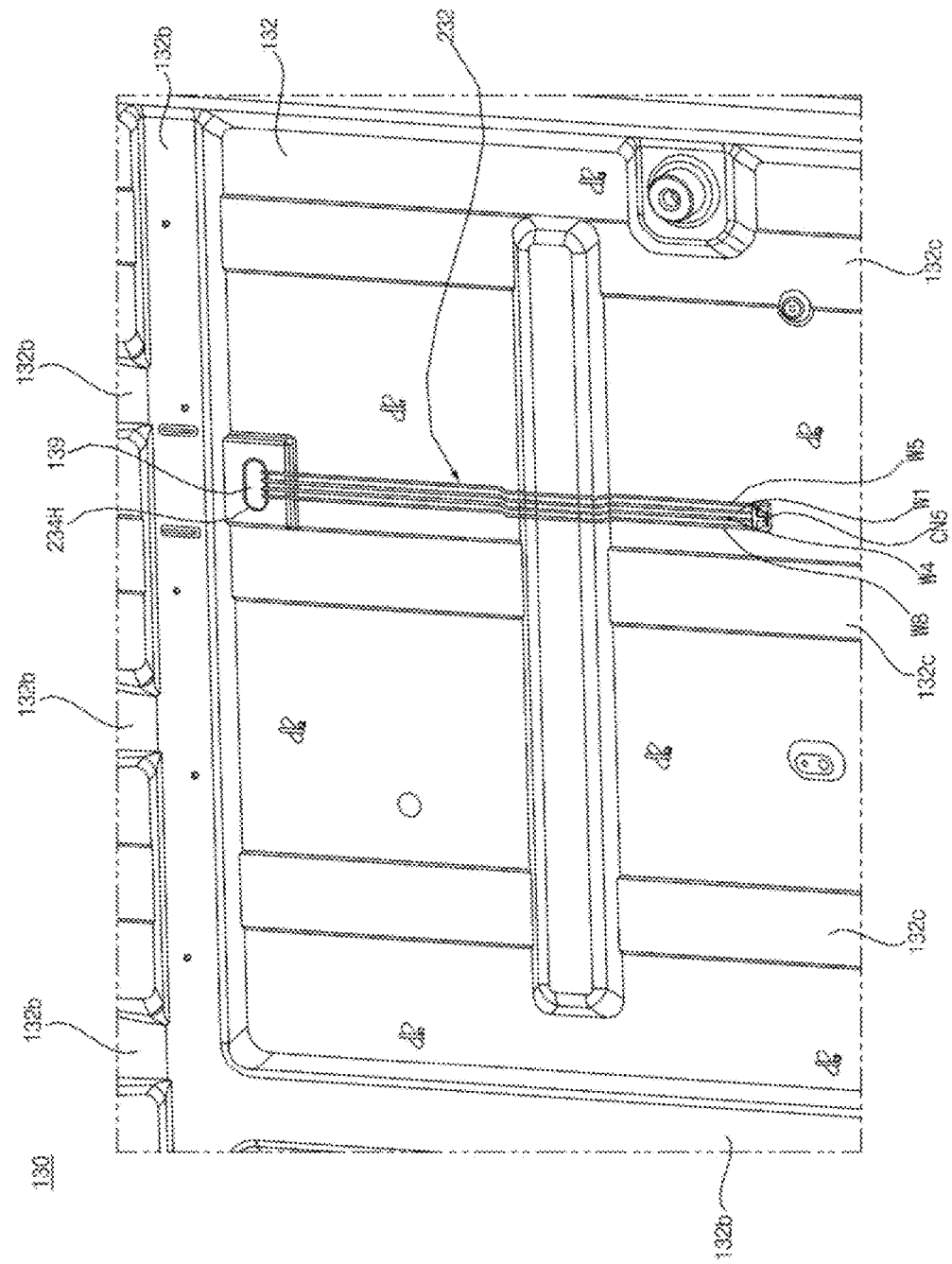

Referring to FIG. 15 together with FIG. 14, the first wire W1, the fourth wire W4, the fifth wire W5, and/or the eight wire W8 may be connected to the power supply 315. The cable 232 may include the first wire W1, the fourth wire W4, the fifth wire W5, and/or the eight wire W8. A cable hole 234H may be formed through the flat portion 132 of the frame 130. The cable 232 may extend from a front surface to a rear surface of the flat portion 132 through the cable hole 234H. The cable 232 may be connected to the power supply 315 through a cable connector CN5.

A sealing member 139 may be inserted or press-fitted into the cable hole 234H. The cable 232 may pass through the sealing member 139. For example, the sealing member 139 may be made of an insulating material or a flame-retardant material having elasticity.

Figure 16:
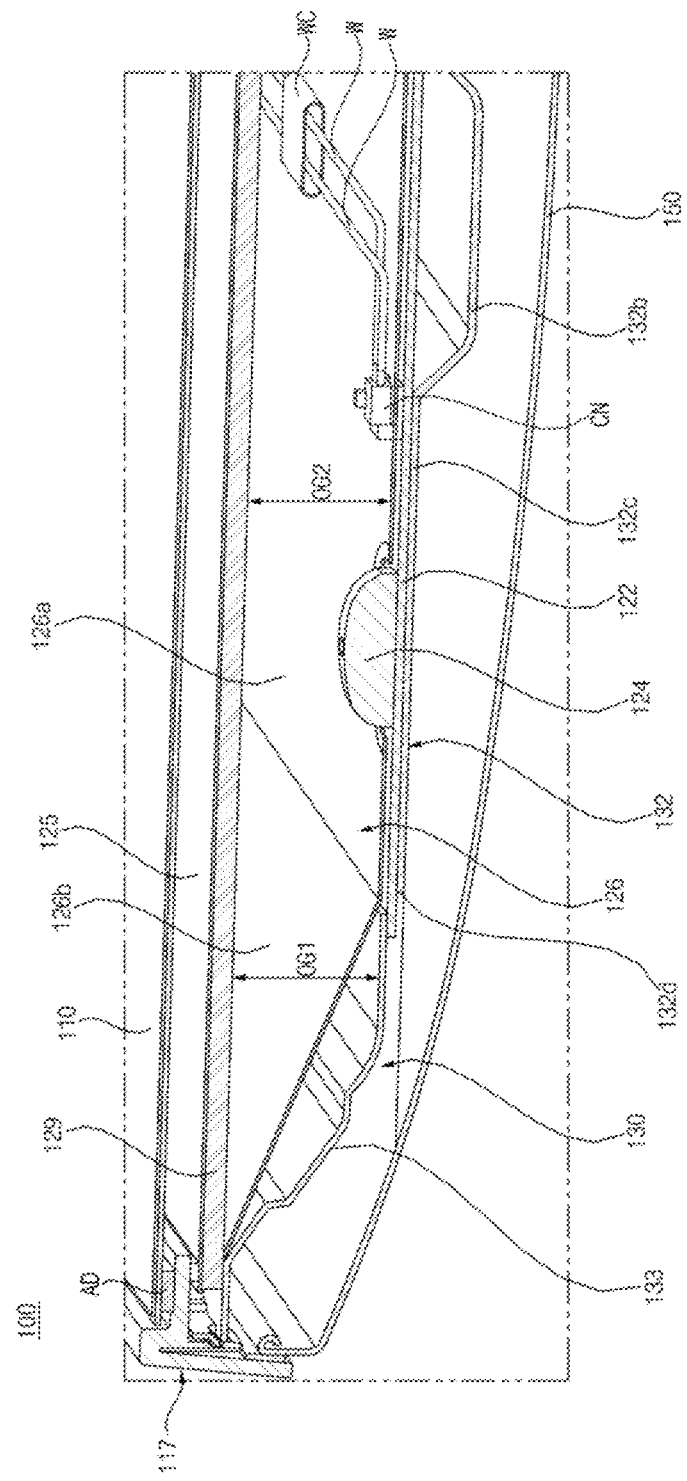

Referring to FIG. 16, the flat portion 132 of the frame 130 may face the rear surface of the display panel 110. The inclined portion 133 of the frame 130 may extend from the flat portion 132 toward an edge of the display panel 110. The inclined portion 133 may have a curve. The curve of the inclined portion 133 may increase the side rigidity of the frame 130.

The guide panel 117 may be coupled to an end of the inclined portion 133 of the frame 130. The display panel 110 may be coupled to the guide panel 117. The guide panel 117 may support the rear surface of the display panel 110. For example, the display panel 110 may be fixed to the guide panel 117 by an adhesive member AD.

The diffusion plate 129 may be placed on the inclined portion 133 of the frame 130. The inclined portion 133 may support a rear surface adjacent to the edge of the diffusion plate 129. The diffusion plate 129 may face the rear surface of the display panel 110. The optical sheet 125 may be placed on the diffusion plate 129. The optical sheet 125 may be fixed on the diffusion plate 129 by the guide panel 117.

The reflective sheet 126 may include a central portion 126a and a side portion 126b. The central portion 126a may be placed on the flat portion 132 of the frame 130. The central portion 126a may face the rear surface of the diffusion plate 129. The side portion 126b may extend from the central portion 126a. The side portion 126b may extend from the central portion 126a to be placed on the inclined portion 133 of the frame 130. An end of the side portion 126b may be fixed between the inclined portion 133 of the frame 130 and the guide panel 117.

The substrate 122 may be positioned on the substrate support portion 132c that is formed on the flat portion 132 of the frame 130. The connector CN may be mounted on the substrate 122. Wires W may be connected to the connector CN. The wires W may be placed on the reinforcing portion 132b. A wire clip WC may hold the wires W together. As the wire W is placed on the reinforcing portion 132b, heat generated from the wire W may be effectively transferred to the rear of the frame 130 through the space of the reinforcing portion 132b, thereby dissipating the heat. The reinforcing portion 132b may serve as a heatsink.

The light assembly 124 mounted on the substrate 122 may pass through the through-hole 235 or a hole 235 formed in the central portion 126a of the reflective sheet 126. The reflective sheet 126 may cover the substrate 122 and/or the flat portion 132 and the inclined portion 133 of the frame 130. Light emitted from the light assembly 124 may be provided to the display panel 110 through the diffusion plate 129 and/or the optical sheet 125. Light emitted from the light assembly 124 may be reflected from the reflective sheet 126 and then may be provided to the display panel 110 through the diffusion plate 129 and/or the optical sheet 125. Light recycling may be achieved between the diffusion plate 129 and the reflective sheet 126.

A distance from the rear surface of the diffusion plate 129 to the flat portion 132 of the frame 130 or the bottom of the inclined portion 133 may be referred to as a first optical distance OG1. A distance from the rear surface of the diffusion plate 129 to the front surface of the reflective sheet 126 may be referred to as a second optical distance OG2. The second optical distance OG2 may be greater than the first optical distance OG1. The second optical distance OG2 may be greater than the first optical distance OG1 by the width of the substrate 122 or more. As the optical distance OG1, OG2 increases, light recycling may be enhanced, thereby increasing the light efficiency provided to the display panel 110.

An end of the substrate 122 may be exposed to the rear surface of the frame 130 through the cut-out portion 132d, so that heat generated from the light assembly 124 and transferred through the substrate 122 may be discharged to the rear of the frame 130. Accordingly, heat dissipation efficiency of the light assembly 124 may be increased.

Thus, it is possible to simultaneously improve the heat dissipation efficiency of the display device 100, the light efficiency by increasing the optical distance OG2, and/or the structural stability of coupling of the light assembly 124, the substrate 122, and the frame 130.

Referring to FIGS. 1 to 16, a display device includes: a display panel; a frame positioned at a rear of the display panel and to which the display panel is coupled; a substrate positioned on the frame between the display panel and the frame; a light assembly mounted on the substrate and configured to provide light to the display panel; and a reflective sheet positioned on the frame and the substrate and having a hole through which the light assembly passes, the reflective sheet reflecting the light provided by the light assembly to the display panel. The frame may include: a sheet support portion to support the reflective sheet; a substrate support portion forming a step descending from the sheet support portion, the substrate support portion defining a gap with the reflective sheet; and a cut-out portion configured as an opening formed through the frame at one side of the substrate support portion. The substrate may be positioned on the substrate support portion of the frame and may be inserted into the cut-out portion.

The substrate may have: a front surface supported on a rear surface of the sheet support portion of the frame; and a rear surface supported on a front surface of the substrate support portion of the frame.

There may be further provided a sealing sheet fixed to the frame at a rear surface of the frame while covering the cut-out portion.

The frame may further include a reinforcing portion forming a step descending from the sheet support portion or the substrate support portion. The substrate may further include a connector electrically connected to the light assembly. The connector may be disposed adjacent to the reinforcing portion.

There may be further provided a cable connected to the connector. The cable may be placed on the reinforcing portion.

The frame may include: a first substrate support portion forming a step descending from the sheet support portion; a second substrate support portion forming a step descending from the sheet support portion, the second substrate support portion being disposed opposite the first substrate support portion with respect to the sheet support portion. The substrate may include: a first substrate positioned on the first substrate support portion; and a second substrate positioned on the second substrate support portion.

The reinforcing portion of the frame may connect the first substrate support portion and the second substrate support portion, and may form a step descending from the first and second substrate support portions. A cable that connects a connector on the first substrate and a connector on the second substrate may be placed between the reinforcing portion and the reflective sheet.

The cable may include a plurality of wires, and the plurality of wires may be held together by a wire clip.

The frame may further include a cable hole formed through the sheet support portion or the reinforcing portion. The cable may extend from a front surface of the frame to a rear surface of the frame through the cable hole.

There may be further provided a sealing member through which the cable passes and inserted into the cable hole, and a power supply positioned at a rear of the frame. The cable may be electrically connected to the power supply at the rear of the frame.

There may be further provided an adhesive member disposed between the substrate and the substrate support portion to allow the substrate to be fixed to the substrate support portion.

There may be further provided a diffusion plate that is positioned between the reflective sheet and the display panel and supported by the frame, and an optical sheet that is positioned between the display panel and the diffusion sheet and includes at least one sheet.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the disclosure should be determined by reasonable interpretation of the appended claims, and all changes coming within the equivalency range of the disclosure are intended to be embraced in the scope of the disclosure.

What is claimed is:

1. A display device comprising:
   a display panel;
   a frame at a rear of the display panel, the display panel coupled with the frame;
   a substrate on the frame between the display panel and the frame;
   a light assembly mounted on the substrate and providing light to the display panel; and
   a reflective sheet positioned on the frame and the substrate, and including a hole through which the light assembly passes, the reflective sheet reflecting the light from the light assembly to the display panel,
   wherein the frame comprises:
   a sheet support portion supporting the reflective sheet;
   a substrate support portion forming a step depressed from the sheet support portion such that a gap is formed between the reflective sheet and the substrate support portion; and
   a cut-out portion forming an opening through the frame at one side of the substrate support portion, and
   wherein the substrate is positioned on the substrate support portion of the frame and is inserted into the cut-out portion.

2. The display panel of claim 1, wherein the substrate including a front surface supported on a rear surface of the sheet support portion of the frame, and a rear surface supported on a front surface of the substrate support portion of the frame.

3. The display device of claim 2, further comprising a sealing sheet fixed to the frame at a rear surface of the frame and covering the cut-out portion.

4. The display device of claim 1, wherein the frame further comprises a reinforcing portion forming a step depressed from the sheet support portion or the substrate support portion,
   wherein the substrate further comprises a connector electrically connected to the light assembly, and
   wherein the connector is disposed adjacent to the reinforcing portion.

5. The display device of claim 4, further comprising a cable connected to the connector,
   wherein the cable is disposed on the reinforcing portion.

6. The display device of claim 4, wherein the frame comprises:
   a first substrate support portion forming a step depressed from the sheet support portion;
   a second substrate support portion forming a step depressed from the sheet support portion, the second substrate support portion being disposed opposite the first substrate support portion with respect to the sheet support portion, and
   wherein the substrate comprises:
   a first substrate positioned on the first substrate support portion; and
   a second substrate positioned on the second substrate support portion.

7. The display device of claim 6, wherein the reinforcing portion of the frame connects the first substrate support portion and the second substrate support portion, and forms a step depressed from the first and second substrate support portions, and
   wherein a cable connecting a connector on the first substrate and a connector on the second substrate is disposed between the reinforcing portion and the reflective sheet.

8. The display device of claim 7, wherein the cable comprises a plurality of wires, and
   wherein the plurality of wires is held together by a wire clip.

9. The display device of claim 8, wherein the frame further comprises a cable hole formed through the sheet support portion or the reinforcing portion, and
   wherein the cable extends from a front surface of the frame to a rear surface of the frame through the cable hole.

10. The display device of claim 9, further comprising:
    a sealing member through which the cable passes, the sealing member being inserted into the cable hole; and
    a power supply positioned at a rear of the frame,
    wherein the cable is electrically connected to the power supply at the rear of the frame.

11. The display device of claim 1, further comprising an adhesive member disposed between the substrate and the substrate support portion such that the adhesive member fixes the substrate to the substrate support portion.

12. The display device of claim 1, further comprising:
    a diffusion plate positioned between the reflective sheet and the display panel, the diffusion sheet being supported by the frame; and
    an optical sheet positioned between the display panel and the diffusion sheet, the optical sheet comprising at least one sheet.

* * * * *